US012179226B1

(12) United States Patent
Goodman et al.

(10) Patent No.: US 12,179,226 B1
(45) Date of Patent: Dec. 31, 2024

(54) LANDSCAPE BEAUTIFICATION SYSTEM

(71) Applicant: Karogen LLC, Delray Beach, FL (US)

(72) Inventors: Kathy E. Goodman, Delray Beach, FL (US); Robert Sunstone, North Palm Beach, FL (US)

(73) Assignee: KAROGEN LLC, Delray Beach, FL (US)

( * ) Notice: Subject to any disclaimer, the term of this patent is extended or adjusted under 35 U.S.C. 154(b) by 0 days.

(21) Appl. No.: 18/825,489

(22) Filed: Sep. 5, 2024

Related U.S. Application Data

(63) Continuation of application No. 18/622,952, filed on Mar. 31, 2024, now Pat. No. 12,121,923.

(51) Int. Cl.

| | |
|---|---|
| ***F21V 33/00*** | (2006.01) |
| ***B05B 1/30*** | (2006.01) |
| ***B05B 15/40*** | (2018.01) |
| ***F21W 121/00*** | (2006.01) |
| ***F21W 121/02*** | (2006.01) |
| ***F21W 131/10*** | (2006.01) |

(52) U.S. Cl.
CPC ............ *B05B 15/40* (2018.02); *B05B 1/3026* (2013.01); *F21V 33/006* (2013.01); *F21W 2121/00* (2013.01); *F21W 2121/02* (2013.01); *F21W 2131/10* (2013.01)

(58) Field of Classification Search
CPC .......................... F21V 33/006; F21W 2121/02
See application file for complete search history.

(56) References Cited

U.S. PATENT DOCUMENTS

| | | | | | |
|---|---|---|---|---|---|
| 1,903,974 | A * | 4/1933 | Brink | B05B 17/08 | 239/18 |
| 5,823,431 | A * | 10/1998 | Pierce | B05B 17/08 | 239/19 |
| 6,202,937 | B1 * | 3/2001 | King | B05B 1/207 | 239/211 |
| 6,431,506 | B1 * | 8/2002 | King | B05B 3/06 | 248/156 |
| 6,439,478 | B1 * | 8/2002 | King | B05B 1/207 | 285/354 |
| 6,588,679 | B1 * | 7/2003 | King | B05B 17/08 | 239/289 |
| 6,644,561 | B1 * | 11/2003 | Daane | B05B 15/00 | 239/18 |
| 7,422,342 | B2 * | 9/2008 | Nanni | F21S 8/00 | 362/101 |
| 2003/0081406 | A1 * | 5/2003 | Lin | F21S 8/081 | 362/183 |
| 2007/0190471 | A1 * | 8/2007 | Lin | F21S 13/12 | 431/320 |
| 2011/0303764 | A1 * | 12/2011 | Roth | F21V 33/006 | 239/289 |
| 2012/0228399 | A1 * | 9/2012 | Forhan | F21V 33/006 | 239/19 |

* cited by examiner

*Primary Examiner* — Alexander K Garlen
(74) *Attorney, Agent, or Firm* — Peter J. Van Bergen

(57) ABSTRACT

A landscape beautification system includes a housing coupled to a riser pipe of a water irrigation system where the riser pipe extends upward from a ground surface. A skirt is disposed about the riser pipe and extends from the housing to the ground surface. A socket is coupled to a sprinkler head that is in fluid communication with the riser pipe.

20 Claims, 9 Drawing Sheets

LANDSCAPE BEAUTIFICATION SYSTEM

This is a continuation of application Ser. No. 18/622,952, filed Mar. 31, 2024.

FIELD OF THE DISCLOSURE

This disclosure relates generally to landscape beautification, and more particularly to a system for the beautification of a landscape's irrigation system via beautification of an irrigation system's sprinkler-head-capped riser pipes.

BACKGROUND

Many water sprinkler systems include what are known as "riser pipes" that extend up from a ground surface. Each such riser pipe is in fluid communication with a water-supply conduit which may be buried beneath the ground surface. Each such riser pipe is "capped" with a water sprinkler head that directs a spray of water in a spray pattern dictated by either a fixed or adjustable configuration of the sprinkler head. This type of water distribution system generally requires numerous riser pipes to provide the necessary irrigation for a landscape that, unfortunately, detracts from a landscape's beauty and is incapable of enhancing the landscape's appearance.

SUMMARY

Accordingly, it is an object of the present disclosure to describe methods and systems for beautifying a landscape via the beautification of one or more of an irrigation system's sprinkler-head-capped riser pipes.

Other objects and advantages of the methods and systems described herein will become more obvious hereinafter in the specification and drawings.

In accordance with methods and systems described herein, a landscape beautification system includes a housing adapted to be coupled to a riser pipe of a water irrigation system wherein the riser pipe extends upward from a ground surface. A skirt is adapted to be disposed about the riser pipe. The skirt extends from the housing to the ground surface. A socket adapted to be coupled to a sprinkler head that is in fluid communication with the riser pipe. A low-voltage light or other decorative item may be placed in the socket.

BRIEF DESCRIPTION OF THE DRAWINGS

Other objects, features and advantages of the methods and systems described in the present disclosure will become apparent upon reference to the following description of the preferred embodiments and to the drawings, wherein corresponding reference characters indicate corresponding parts throughout the several views of the drawings and wherein.

DETAILED DESCRIPTION

Figure 1:
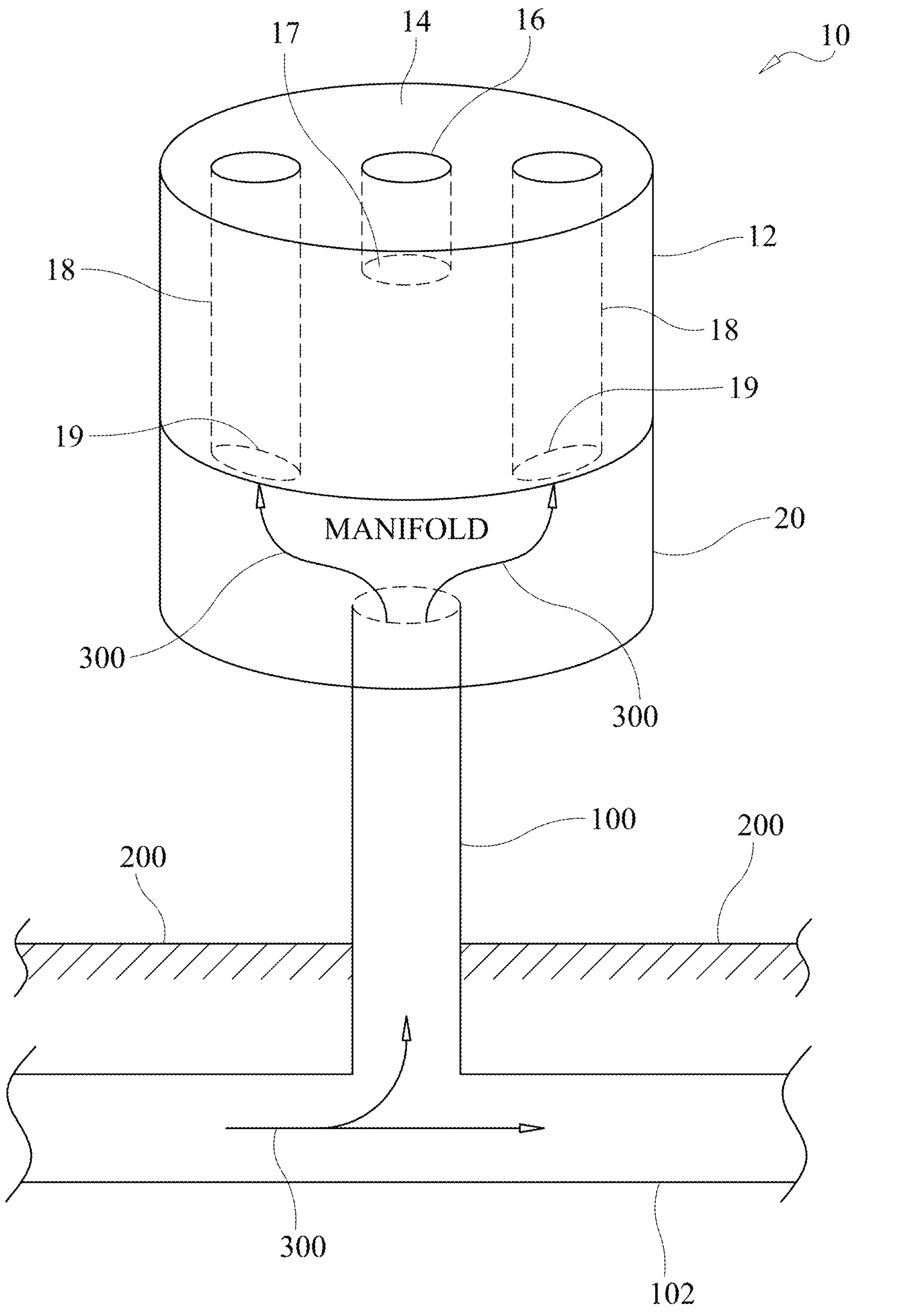
FIG. 1 is a schematic view of an embodiment of a multifunctional sprinkler platform in accordance with various aspects as described herein.

Referring now to the drawings and more particularly to FIG. 1, a schematic view of an embodiment of a multifunctional sprinkler platform in accordance with the present disclosure is shown and is referenced generally by numeral 10. Sprinkler platform 10 is configured for cooperation with a riser pipe 100 of a water irrigation system. Riser pipe 100 extends upward from a ground surface 200. Typically, riser pipe 100 is supplied with a flow of water 300 via a supply line 102 that may be buried beneath ground surface 200. Materials and configurations of riser pipe 100 and supply line 102 are well-understood in the art, are not part of sprinkler platform 10, and are not limitations on sprinkler platform 10.

Sprinkler platform 10 includes a housing 12 that may be coupled to riser pipe 100 in a variety of ways without departing from the scope of the present disclosure. Housing 12 may be made from a variety of materials to include plastics, metals, composites, and combinations thereof. In the illustrated embodiment, housing 12 is a cylindrical housing have a circular cross-section. However, it is to be understood that the cross-sectional shape of housing 12 may have other geometric shapes (e.g., oval, triangular, square, etc.) without departing from the scope of the present disclosure.

When coupled to riser pipe 100 as shown, a top surface 14 of housing 12 is spaced apart from riser pipe 100 and is readily accessible. Housing 12 includes or defines a socket 16 that is open and accessible from positions above surface 14 but has a closed end 17. The size and shape of socket 16 are not limitations of the present disclosure. In some embodiments, the walls of socket 16 may extend above surface 14. In some embodiments, the inside and/or outside walls of socket 16 may be threaded or otherwise configured for cooperation with an item to be supported in/by socket 16. Socket 16 may be integrated with housing 12 or may be separable therefrom without departing from the scope of the present disclosure. As will be explained further below, socket 16 serves as a docking point for a landscape enhancement feature.

Housing 12 also defines one or more conduits 18 that are open at surface 14 and have open ends 19 within housing 12. In the illustrated embodiment, two conduits 18 are shown. However, it is to be understood that one conduit 18 or more than two conduits 18 may be provided without departing from the scope of the present disclosure. As will be explained further below, each conduit 18 directs a flow of water to surface 14 for distribution into the air via a sprinkler head (not shown).

Sprinkler platform 10 also includes a manifold 20. In general, manifold 20 provides the structure that distributes the flow of water 300 to the open ends 19 of conduits 18. As will be explained further below, manifold 20 may be disposed in or incorporated into housing 12, or may be located outside of housing 12 without departing from the scope of the present disclosure.

A number of non-limiting embodiments of a multifunctional sprinkler platform in accordance with the present disclosure will now be described with reference to FIGS. 2-12. It is to be understood that the various features described in the figures may be combined in a variety of ways in a single embodiment without departing from the scope of the present disclosure.

Figure 2:
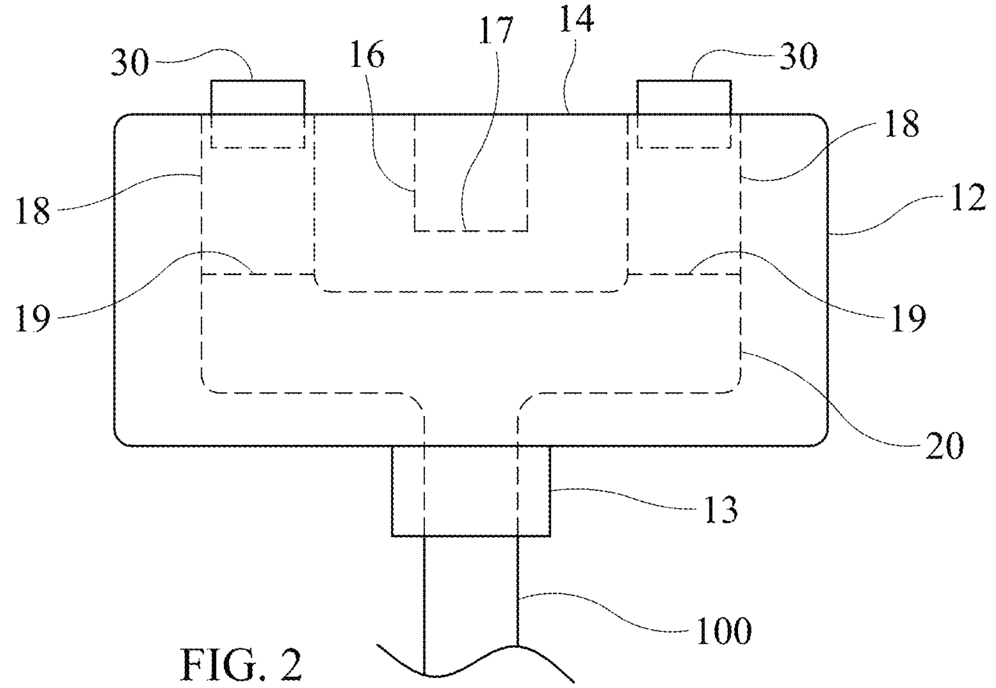
FIG. 2 is a side view of an embodiment of a multifunctional sprinkler platform whose manifold is disposed in the platform's housing in accordance with various aspects as described herein.
Figure 3:
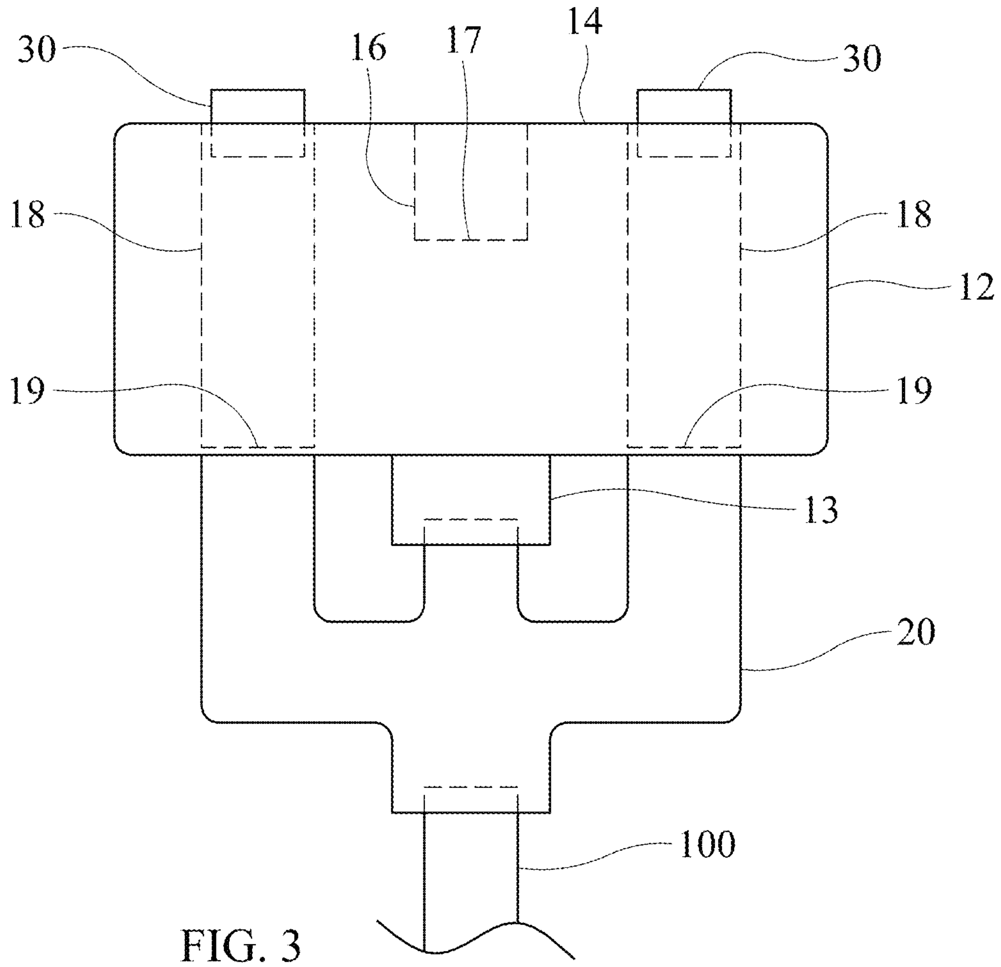
FIG. 3 is a side view of another embodiment of a multifunctional sprinkler platform whose manifold is outside of the platform's housing in accordance with various aspects as described herein.

Referring first to FIG. 2, a sprinkler platform's housing 12 is coupled to the top region of riser pipe 100. More specifically, the platform's housing 12 may include a coupling 13 to provide for permanent attachment (e.g., via gluing, fusing, etc.) or removable attachment (e.g., via threaded engagement, quick connect, etc.) to the riser pipe. Disposed within or incorporated into housing 12 is manifold 20 that is in fluid communication with riser pipe 100 and each open end 19 of conduits 18. In some embodiments and as shown in FIG. 3, manifold 20 is disposed outside of housing 12 with coupling 13 attached to a portion of manifold 20 as illustrated. In both FIGS. 2 and 3, one or both of open conduits 18 at surface 14 are "sealed" with a sprinkler head 30. Sealing of each sprinkler head 30 in its corresponding conduit 18 may be achieved in a variety of ways without departing from the scope of the present disclosure, e.g., threaded engagement, using washers/o-rings/sealing putty, etc. In some embodiments, an adapter (not shown) may be used to couple sprinkler head 30 to its conduit 18.

Figure 4:
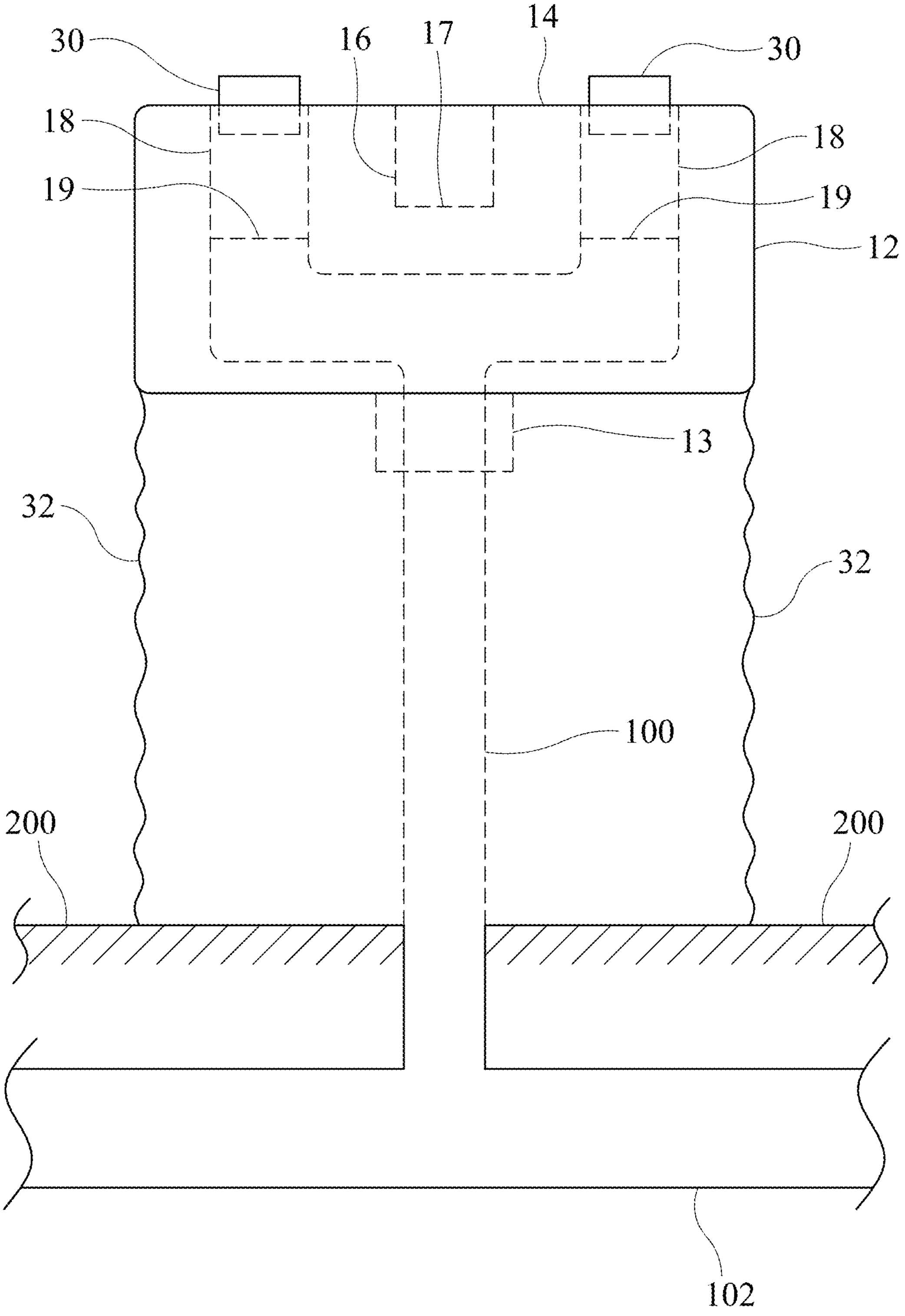
FIG. 4 is a side view of another embodiment of a multifunctional sprinkler platform that includes a decorative, supporting, and/or protective skirt coupled to the platform's housing in accordance with various aspects as described herein.
Figure 5:
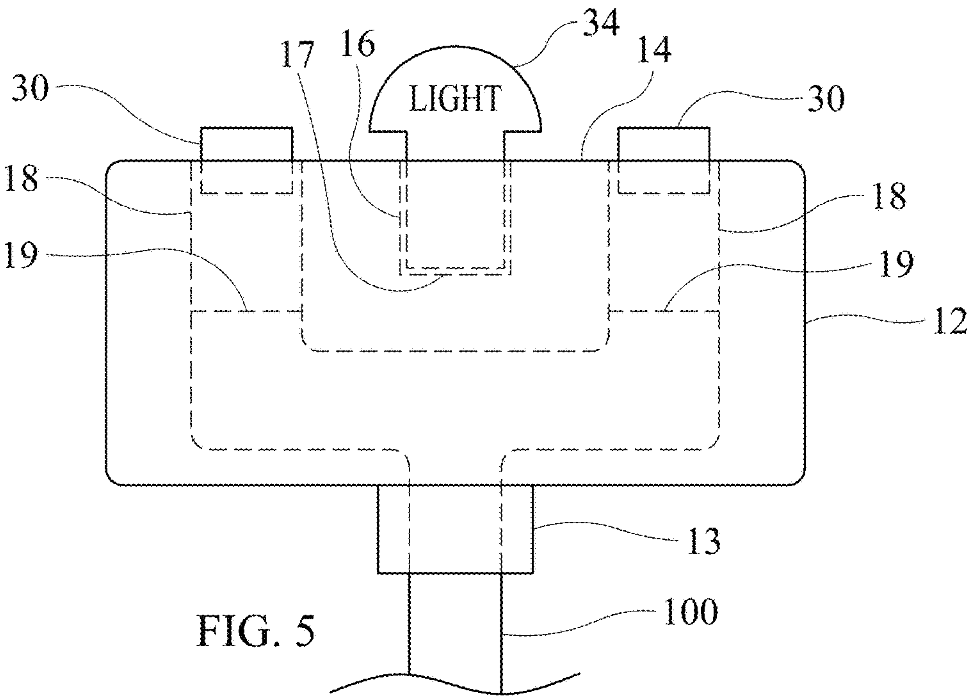
FIG. 5 is a side view of another embodiment of a multifunctional sprinkler platform that includes a low-voltage light and multiple sprinkler heads in accordance with various aspects as described herein.

In some embodiments and as illustrated in FIG. 4, a skirt 32 may be coupled to housing 12. Skirt 32 may be a rigid or flexible skirt. In general, skirt 32 is disposed about and is spaced apart from riser pipe 100 when housing 12 is coupled to the riser pipe. In some embodiments, skirt 32 is sized to extend down to ground surface 200. Skirt 32 may be configured to present a decorative appearance to complement or blend into a surrounding landscape, configured to protect riser pipe 100 from damage during landscape maintenance, configured to support housing 12, and/or configured to stabilize sprinkler platform 10 and riser pipe 100.

As mentioned above, socket 16 may be used as a docking point for an item that enhances the usefulness and/or beautification of the landscape area where the corresponding sprinkler platform is installed. For example and with reference to FIG. 5, a low-voltage light 34 (e.g., a solar-powered light, a battery-powered lights, etc.) may be placed in socket 16. In some embodiments, low-voltage light 34 may have a low-voltage line (not shown) connected thereto to power the light. In some embodiments, a passive decorative item (not shown) may be placed in socket 16. Such decorative items may include, but are not limited to, flags, signs, characters, etc. In some embodiments, the item placed in socket 16 may have multiple functions, e.g., a light and a passive decorative item.

Figure 6:
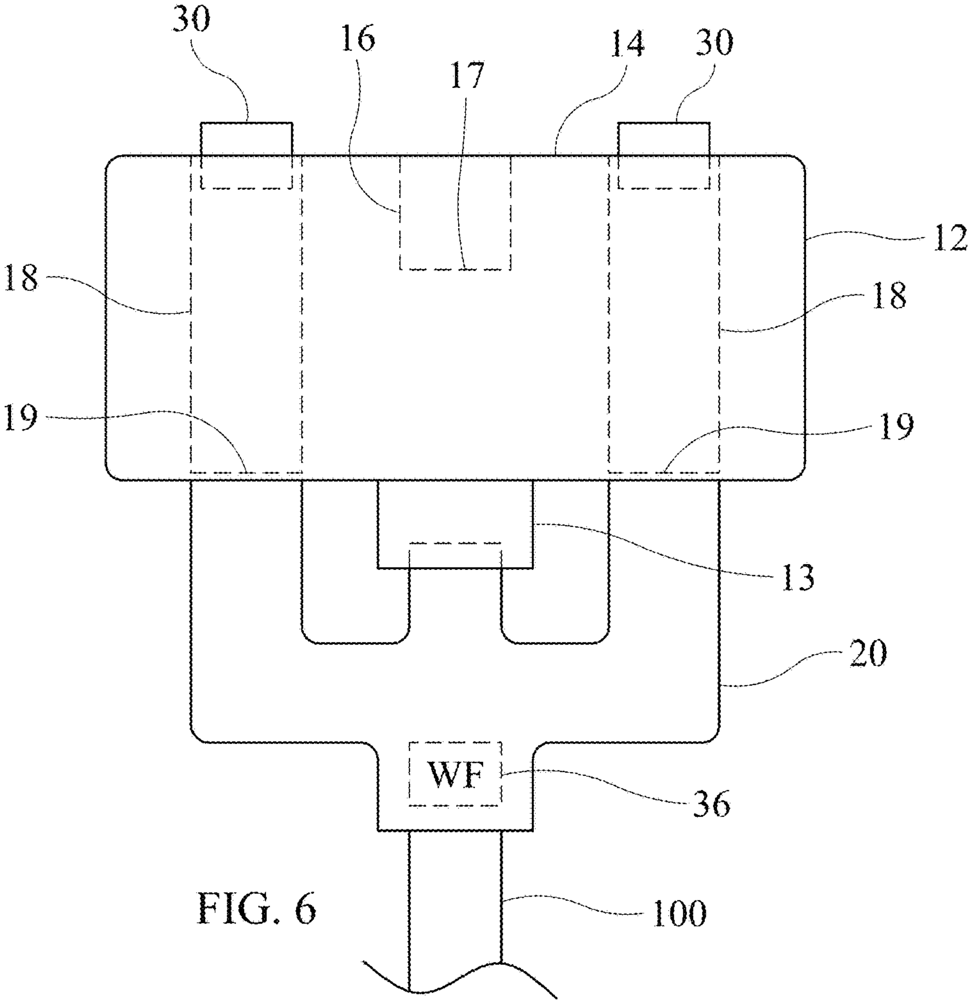
FIG. 6 is a side view of another embodiment of a multifunctional sprinkler platform that includes a water filter disposed in the platform's manifold accordance with various aspects as described herein.

In some embodiments and as illustrated in FIG. 6, a water filter ("WF") 36 may be coupled to or mounted in manifold 20 (as shown) such that water filter 36 filters the flow of water exiting riser pipe 100 when the sprinkler platform is coupled to the riser pipe. Water filter 36 may be configured for attachment to and removal from manifold 20 to facilitate the cleaning and/or replacement of water filter 36.

Figure 7:
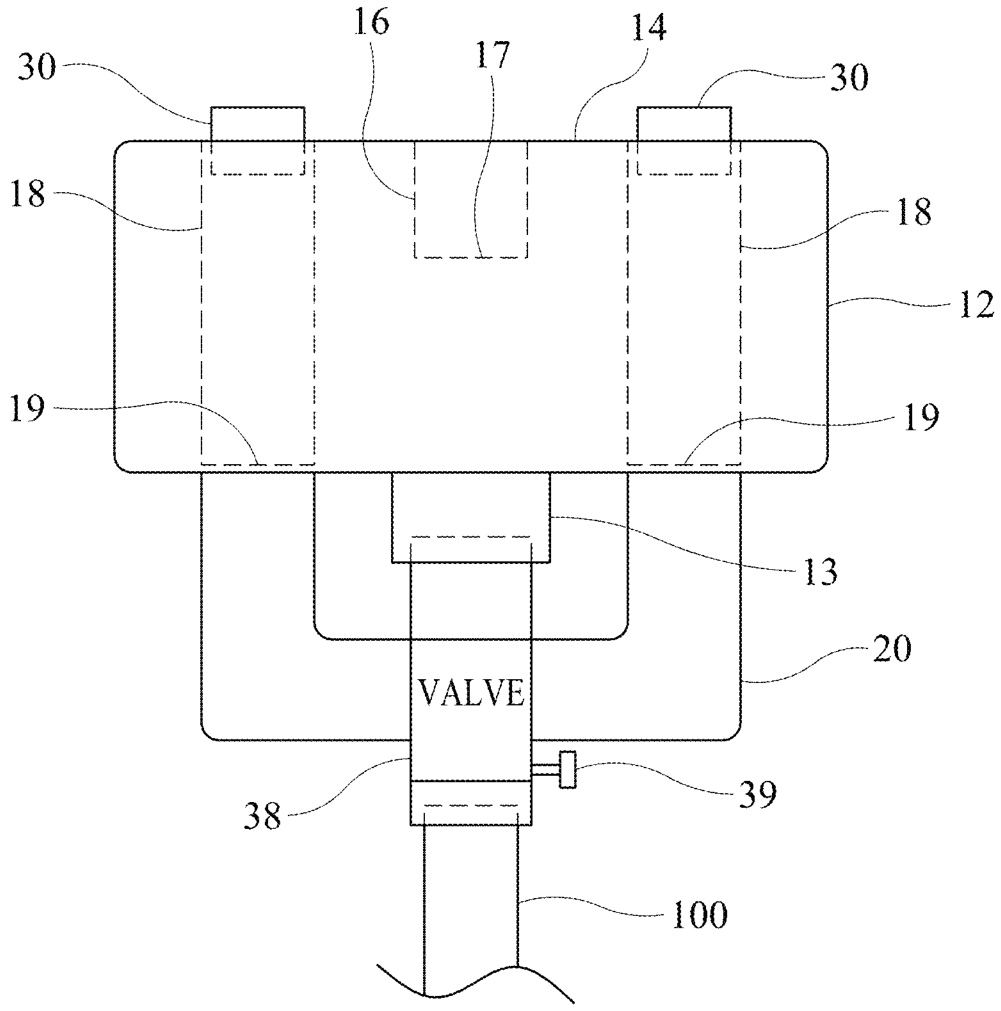
FIG. 7 is a side view of another embodiment of a multifunctional sprinkler platform whose manifold includes a control valve operable to control the flow of water through the manifold in accordance with various aspects as described herein.

In some embodiments and as illustrated in FIG. 7, a valve 38 may be disposed in manifold 20 to provide for the adjustment of the flow of water through the manifold. For example, a manual control 39 may be operably coupled to valve 38 and made accessible to a user outside of housing 12. In some embodiments, multiple valves may be provided so that the flow of water may be controlled for each conduit 18 and the corresponding sprinkler head 30 mounted therein.

Figure 8:
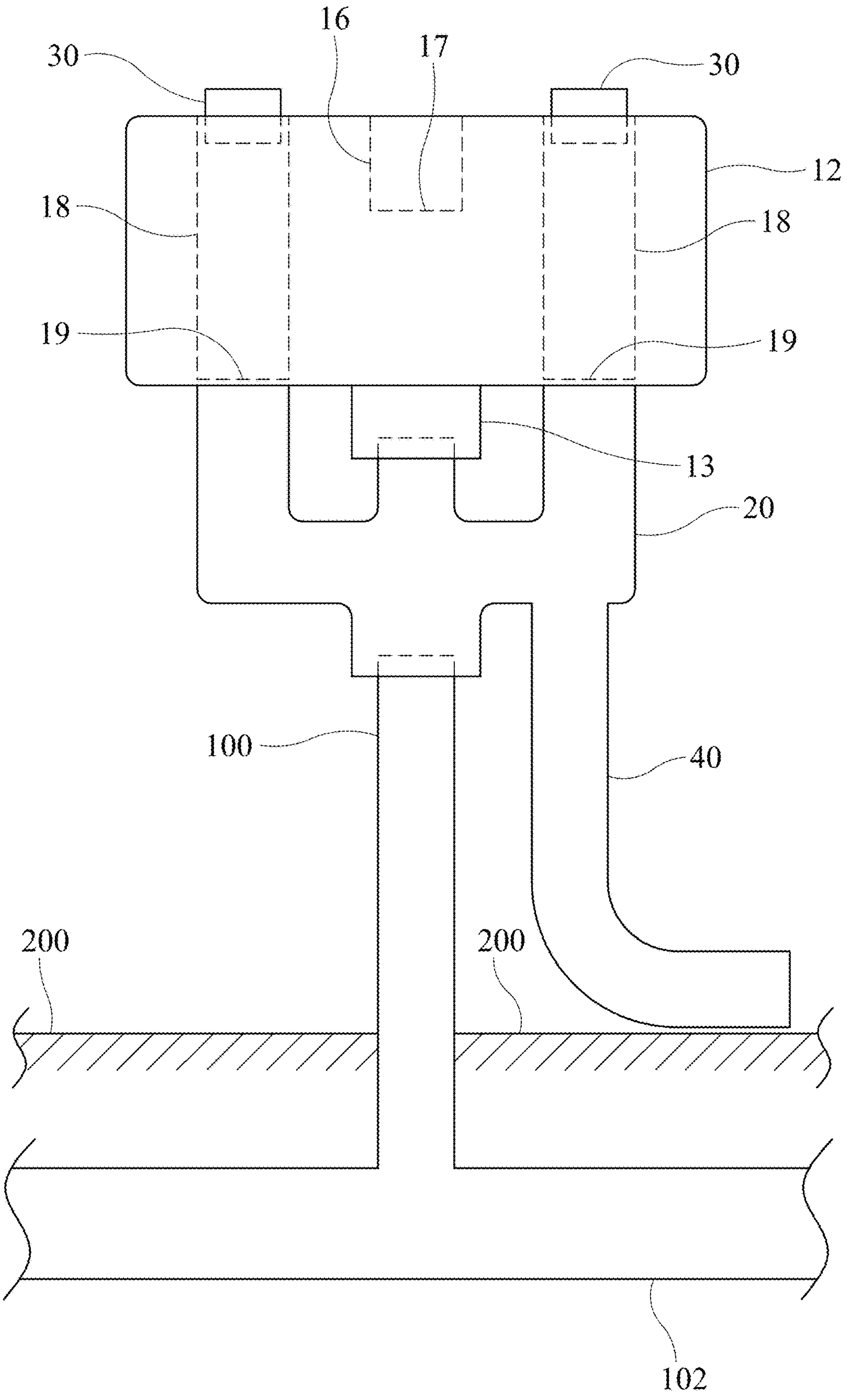
FIG. 8 is a side view of another embodiment of a multifunctional sprinkler platform that includes a drip-irrigation conduit coupled to the platform's manifold in accordance with various aspects as described herein.

In some embodiments an as illustrated in FIG. 8, a drip-irrigation line or conduit 40 may be coupled to and placed in fluid communication with manifold 20. Drip-irrigation conduit 40 may extend down to and along ground surface 200 to provide drip irrigation to landscape features near riser pipe 100. This feature may be beneficial for landscape features requiring less water than what would normally be supplied by sprinkler heads 30.

Figure 9:
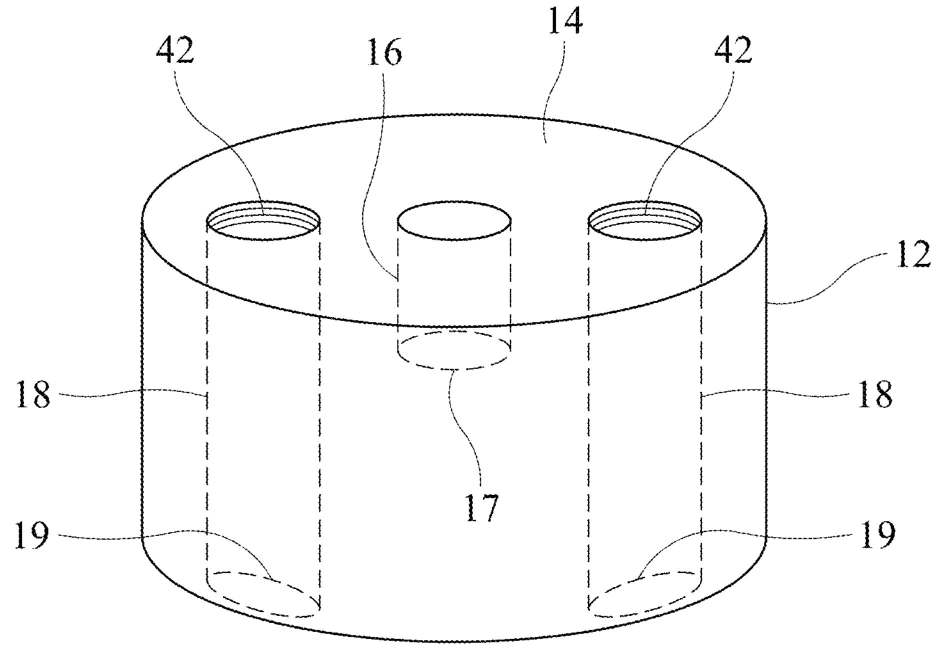
FIG. 9 is an isolated perspective view of an embodiment of a multifunctional sprinkler platform's housing illustrating threaded open ends of the housing's conduits in accordance with various aspects as described herein.
Figure 10:
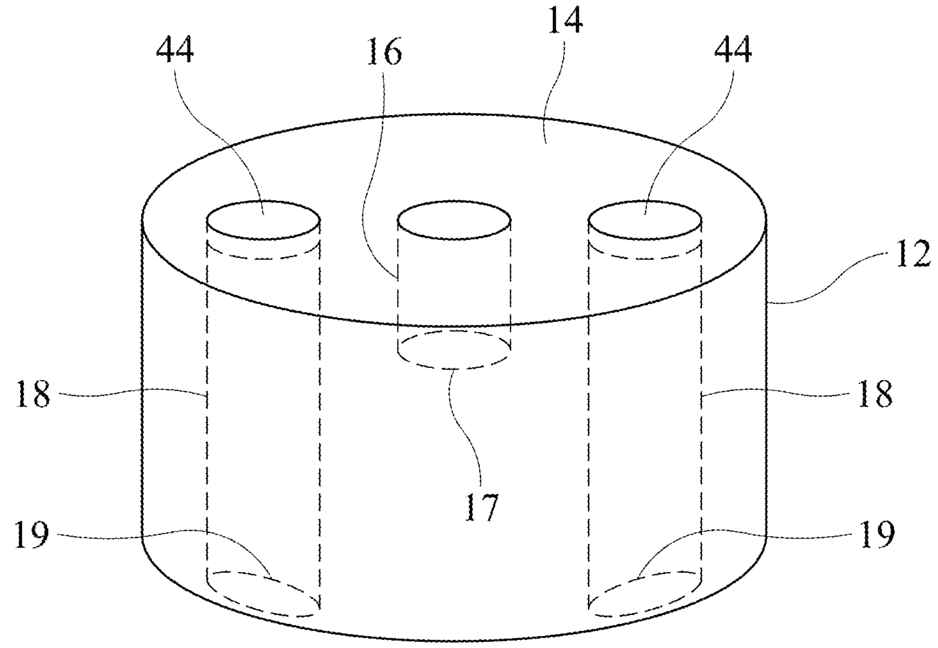
FIG. 10 is an isolated perspective view of another embodiment of a multifunctional sprinkler platform's housing illustrating knock-out plugs disposed in the open ends of the housing's conduits in accordance with various aspects as described herein.

In some embodiments and as illustrated in FIG. 9, the open ends of conduits 18 at surface 14 may be threaded as indicated by numeral 42 for engagement with a sprinkler head (not shown). Washers, o-rings, and/or putty (not shown) may be used to create a water-tight seal with the sprinkler head mounted in conduit 18 as would be well-understood in the art. In some embodiments and as illustrated in FIG. 10, housing 12 may be manufactured with a sealing "plug" 44 that is removed by a user prior to the installation of a sprinkler head. Plug 44 may be engaged with threads in conduit 18 near surface 14 (e.g., threads 42 illustrated in FIG. 9). In some embodiments, plug 44 may be configured as a "knock-out" portion of surface 14 that remains in place to seal conduit 18 at surface 14 until a user removes it.

Figure 11:
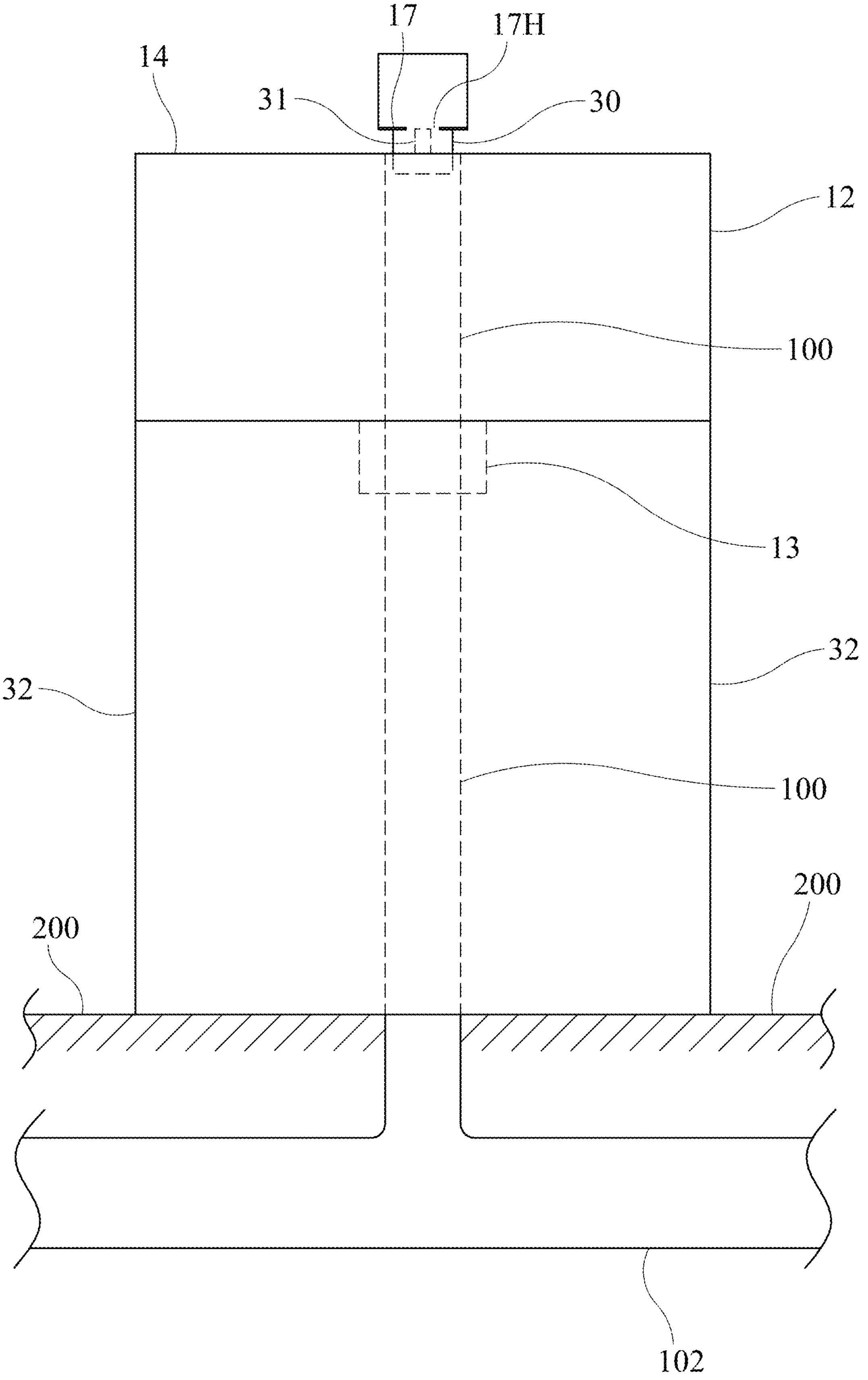
FIG. 11 is a side view of another embodiment of a multifunctional sprinkler platform whose housing is coupled to an existing riser pipe capped with a sprinkler head with a separate decoration or light-receiving socket mounted on top of the sprinkler head in accordance with various aspects as described herein.
Figure 12:
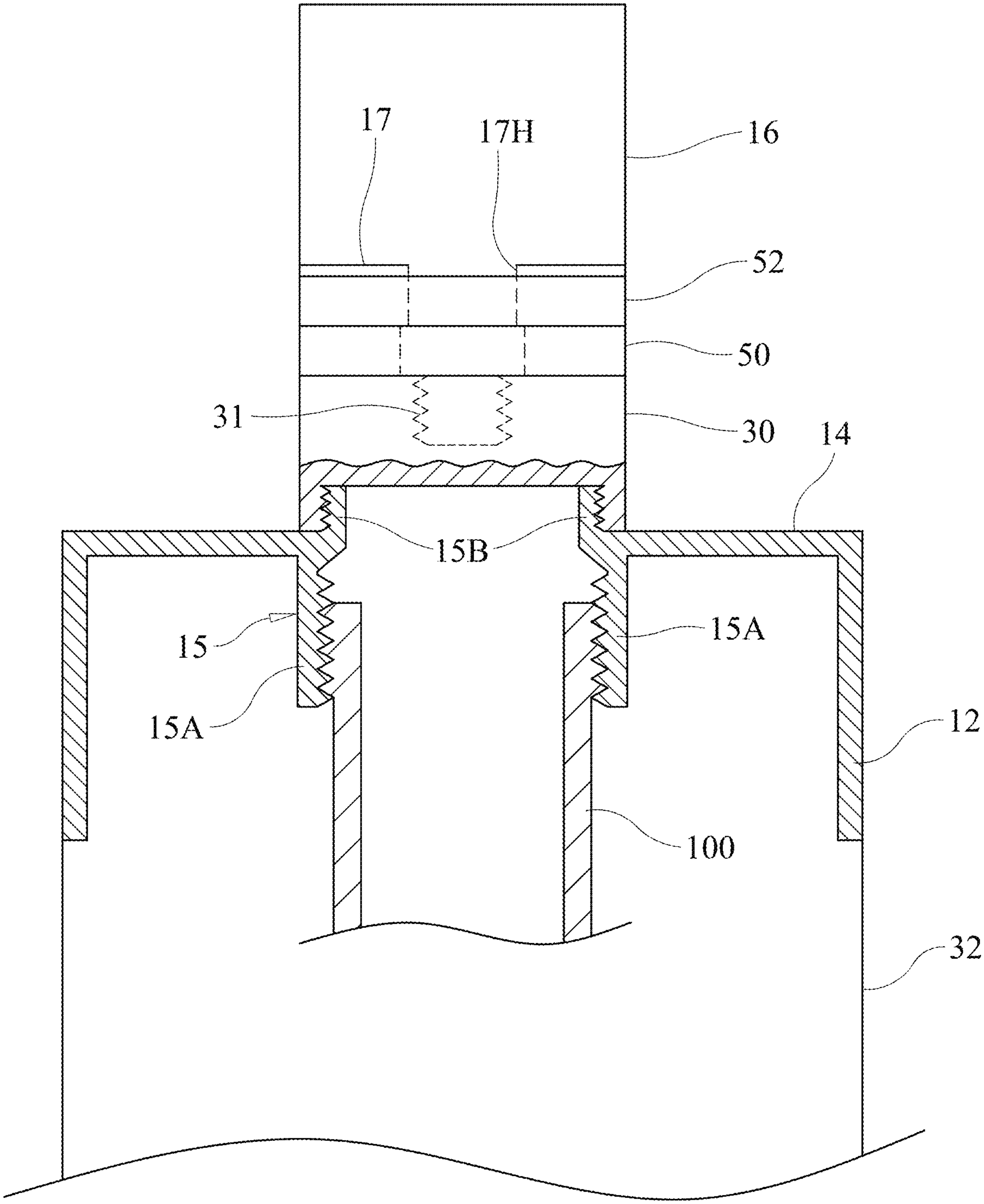
FIG. 12 is a partial cross-sectional and partial side view of an embodiment of a multifunctional sprinkler platform whose housing is coupled to an existing riser pipe capped with a sprinkler head illustrating a mounting arrangement for a decoration or light-receiving socket on top of the sprinkler head in accordance with various aspects as described herein.

In some embodiments and as illustrated in FIG. 11, housing 12 and its coupling 13 along with skirt 32 may be configured to drop over an existing riser pipe 100 with a sprinkler head 30 coupled thereto. In this embodiment, socket 16 is a stand-alone element that is coupled to the top of the existing sprinkler head 30. Socket 16 may have a hole 17H in its socket end 17 to allow for access to a spray-adjustment screw 31 typically accessible the top of many sprinkler heads. As in the previously-described embodiments, socket 16 serves as a docking point for an item such as a low-voltage light or other decorative feature.

The coupling of socket 16 to sprinkler head 30 may be achieved in a variety of ways to include permanent attachment schemes (e.g., gluing, fusing, etc.) as well as removable attachment schemes. One such removable attachment scheme illustrated in FIG. 12 includes a housing 12 (illustrated in cross-section) that incorporates an adapter 15 having an inside portion 15A sized/threaded for engagement with the top of riser pipe 100 and having an outside portion 15B extending up from surface 14. Outside portion 15B is sized/threaded at its inside or outside (as shown) walls for engagement with a sprinkler head 30. A donut-shaped metal plate 50 and a donut-shaped magnet 52 are used to couple the base of socket 16 to sprinkler head 30. Metal plate 50 is coupled (e.g., glued) to the top of sprinkler head 30 and socket 16 with magnet 52 attached thereto is magnetically coupled to metal plate 50. Hole 17H and the donut shapes of metal plate 50 and magnet 52 provide user access to the sprinkler head's spray adjustment screw 31 via socket 16. In some embodiments, plate 50 may be replaced by a magnet and magnet 52 may be replaced by a plate or the base of socket 16 may be a magnetic metal.

The advantages of the methods and systems described herein are numerous. An irrigation system's riser pipes may be readily outfitted the herein-described sprinkler platforms. Sprinkler head(s) are positioned and configured for their desired spray pattern and decorative features (e.g., lights) are readily supported by the platforms. The ability to support the use of multiple sprinkler heads with a single riser pipe will reduce the number of riser pipes for a landscape. A protective and/or decorative skirt may be included to further enhance the usefulness of the sprinkler platform as well as enhance the beauty of the landscape. One or more additional features described herein may be included in the sprinkler platform to satisfy the needs of a particular application.

Although the methods and systems presented herein have been described for specific embodiments thereof, there are numerous variations and modifications that will be readily apparent to those skilled in the art in light of the above teachings. It is therefore to be understood that, within the scope of the appended claims, the methods and systems presented herein may be practiced other than as specifically described.

What is claimed as new and desired to be secured by Letters Patent of the United States is:

1. A landscape beautification system, comprising:
- a housing coupled to a riser pipe of a water irrigation system wherein the riser pipe extends upward from a ground surface;
- a skirt disposed about the riser pipe, said skirt extending from said housing to the ground surface; and
- a socket coupled to a sprinkler head, the sprinkler head engaged with the housing and in fluid communication with the riser pipe.

2. The landscape beautification system of claim 1, wherein said skirt is rigid.

3. The landscape beautification system of claim 1, wherein said skirt is coupled to said housing.

4. The landscape beautification system of claim 1, further comprising:
- a low-voltage light disposed in said socket, said low-voltage light selected from the group including solar-powered lights and battery-powered lights.

5. The landscape beautification system of claim 1, wherein said socket has a base with a hole aligned with a spray adjustment screw of the sprinkler head.

6. The landscape beautification system of claim 1, wherein said socket is magnetically coupled to the sprinkler head.

7. The landscape beautification system of claim 1, wherein said housing is in threaded engagement with the riser pipe.

8. The landscape beautification system of claim 1, wherein said housing includes a conduit portion in threaded engagement with the riser pipe and in threaded engagement with the sprinkler head, wherein said conduit portion is adapted to conduct water flowing through the riser pipe to the sprinkler head.

9. A landscape beautification system, comprising:
- a housing coupled to a riser pipe of a water irrigation system wherein the riser pipe extends upward from a ground surface;
- said housing including a conduit portion having a first end in threaded engagement with the riser pipe, said conduit portion having a second end in threaded engagement with a sprinkler head, wherein said conduit portion is adapted to conduct water flowing through the riser pipe to the sprinkler head;
- a skirt disposed about the riser pipe, said skirt extending from said housing to the ground surface; and
- a socket coupled to the sprinkler head.

10. The landscape beautification system of claim 9, wherein said skirt is rigid.

11. The landscape beautification system of claim 9, wherein said skirt is coupled to said housing.

12. The landscape beautification system of claim 9, further comprising:
- a low-voltage light disposed in said socket, said low-voltage light selected from the group including solar-powered lights and battery-powered lights.

13. The landscape beautification system of claim 9, wherein said socket has a base with a hole aligned with a spray adjustment screw of the sprinkler head.

14. The landscape beautification system of claim 9, wherein said socket is magnetically coupled to the sprinkler head.

15. A landscape beautification system, comprising:
- a housing coupled to a riser pipe of a water irrigation system wherein the riser pipe extends upward from a ground surface to a sprinkler head, the sprinkler head engaged with the housing and in fluid communication with the riser pipe;
- a skirt disposed about the riser pipe, said skirt extending from said housing to the ground surface;
- a socket having a base with a hole; and
- a magnetic coupler coupled to the sprinkler head, said magnetic coupler magnetically coupled to said base and aligning said hole in said base with a spray adjustment screw of the sprinkler head.

16. The landscape beautification system of claim 15, wherein said skirt is rigid.

17. The landscape beautification system of claim 15, wherein said skirt is coupled to said housing.

18. The landscape beautification system of claim 15, further comprising:
- a low-voltage light disposed in said socket, said low-voltage light selected from the group including solar-powered lights and battery-powered lights.

19. The landscape beautification system of claim 15, wherein said housing is in threaded engagement with the riser pipe.

20. The landscape beautification system of claim 15, wherein said housing includes a conduit portion in threaded engagement with the riser pipe and in threaded engagement with the sprinkler head, wherein said conduit portion is adapted to conduct water flowing through the riser pipe to the sprinkler head.

* * * * *